(12) United States Patent
Djadi

(10) Patent No.: US 10,983,851 B1
(45) Date of Patent: Apr. 20, 2021

(54) PROTECTING AGAINST MEMORY CORRUPTION AND SYSTEM FREEZE DURING POWER STATE TRANSITIONS IN A MULTI-POWER DOMAIN SYSTEM

(71) Applicant: Cirrus Logic International Semiconductor Ltd., Edinburgh (GB)

(72) Inventor: Younes Djadi, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 16/703,024

(22) Filed: Dec. 4, 2019

(51) Int. Cl.
| | | |
|---|---|---|
| G06F 11/00 | (2006.01) | |
| G06F 1/3287 | (2019.01) | |
| G06F 1/3206 | (2019.01) | |
| G06F 1/3228 | (2019.01) | |
| G06F 11/07 | (2006.01) | |
| G06F 13/362 | (2006.01) | |
| G06F 1/26 | (2006.01) | |

(52) U.S. Cl.
CPC ............ *G06F 11/004* (2013.01); *G06F 1/263* (2013.01); *G06F 1/3206* (2013.01); *G06F 1/3228* (2013.01); *G06F 1/3287* (2013.01); *G06F 11/0757* (2013.01); *G06F 13/3625* (2013.01)

(58) Field of Classification Search
CPC .......... G06F 1/263; G06F 1/32; G06F 1/3206; G06F 1/3228; G06F 1/3287; G06F 13/3625; G06F 11/004; G06F 11/0757
See application file for complete search history.

(56) References Cited

U.S. PATENT DOCUMENTS

| | | | | |
|---|---|---|---|---|
| 7,369,815 B2* | 5/2008 | Kang | .................. | H04W 52/028 455/73 |
| 9,407,264 B1* | 8/2016 | Ali | ...................... | H03K 19/0016 |
| 2003/0089675 A1* | 5/2003 | Koestler | ................. | G06F 21/31 213/201 |
| 2005/0232053 A1* | 10/2005 | Azuma | .................. | G11C 5/147 365/226 |
| 2009/0259864 A1* | 10/2009 | Li | .......................... | G06F 1/3293 713/323 |
| 2012/0025905 A1* | 2/2012 | Hoshi | .................... | G06F 1/3203 327/564 |
| 2012/0068539 A1* | 3/2012 | Shiotani | .................... | G06F 1/30 307/43 |
| 2012/0275236 A1* | 11/2012 | Hess | ...................... | G06F 1/3203 365/189.02 |
| 2016/0239060 A1* | 8/2016 | Koob | ........................ | G06F 1/26 |
| 2017/0085253 A1* | 3/2017 | Cao | ...................... | H03K 3/3562 |

(Continued)

*Primary Examiner* — Thomas J. Cleary
(74) *Attorney, Agent, or Firm* — Jackson Walker L.L.P.

(57) ABSTRACT

A system may include a switchable power domain configured to selectively be powered on and powered off during operation of the system and an always-on power domain configured to remain powered on during operation of the system, the always-on power domain including a power management unit. The power management unit may be configured to, in response to a shut down condition for powering down the switchable power domain, determine a state of a bus transaction on a communication bus between the switchable power domain and the always-on power domain and control one or more control signals for controlling the communication bus in order to manipulate completion of the bus transaction to prevent at least one of corruption of data of the bus transaction and a system freeze associated with the bus transaction.

16 Claims, 6 Drawing Sheets

(56) References Cited

U.S. PATENT DOCUMENTS

2017/0285705 A1* 10/2017 Podaima ................. G06F 1/266
2018/0314659 A1* 11/2018 Batenburg ............ G06F 1/3287
2018/0316180 A1* 11/2018 Batenburg ............... H02H 3/20
2019/0187770 A1*  6/2019 Severino ............... G06F 1/3287
2019/0317579 A1* 10/2019 Mishra ..................... G06F 1/28

* cited by examiner

PROTECTING AGAINST MEMORY CORRUPTION AND SYSTEM FREEZE DURING POWER STATE TRANSITIONS IN A MULTI-POWER DOMAIN SYSTEM

FIELD OF DISCLOSURE

The present disclosure relates in general to electronic devices, and more particularly, to protecting against memory corruption and system freeze during power state transitions in a multi-power domain system, as may be used in a system for controlling a position of a camera in a mobile device, and/or other suitable applications.

BACKGROUND

Many traditional mobile devices (e.g., mobile phones) include one or more cameras for capturing images. To provide for image stabilization and focus, a position of a camera within a plane substantially parallel to a subject of an image as well as a position of a lens of the camera in a direction perpendicular to such plane, may be controlled by a plurality of motors under the control of a camera controller. A control system may be implemented using an applications processor of the mobile device coupled via a communication interface (e.g., an Inter-Integrated Circuit or I2C interface) to a camera controller local to the camera and its various motors. For example, the applications processor may communicate to the camera controller a vector of data regarding a target position, whereas the camera controller may communicate to the applications processor a vector regarding an actual position of the camera, as sensed by a plurality of magnetic sensors (e.g., Hall sensors) and/or other appropriate sensors.

This vector data may be communicated through various buses and stored in one or more memory buffers or registers. Oftentimes, such memory circuitry will be implemented across multiple power domains, including one or more power domains that are "always on" and one or more power domains that may be selectively switched on and off. The always on power domain may be used for critical processing and retaining critical information, while the switchable power domain may be turned off to conserve energy and/or prevent overheating.

However, a device with multiple power domains with a pipelined system communication bus may suffer from at least two data access issues that may result during power transitions.

A first data access issue is the possibility of data corruption. During operation, it is possible that a bus master in the switchable power domain is powered down while writing to a register in the always-on power domain (i.e., before the write is completed). Such powering down may result in corrupting the always-on register contents. Such corruption may put the device in an undesired state and therefore may require powering down the whole device and reinitializing it to put it back to a normal functioning state.

A second data access issue is the possibility of system freeze. During operation, it is possible that a bus slave in the switchable power domain is powered down while it is being accessed by a master in the always-on power domain (i.e., before the transaction is completed). Such powering down may result in the bus master waiting indefinitely for the transaction to complete, therefore freezing the system and requiring powering down the whole device to put it back to a normal functioning state. Such powering down may also invalidate the read data if the slave is powered down during a read transaction.

SUMMARY

In accordance with the teachings of the present disclosure, one or more disadvantages and problems associated with existing approaches to protecting against memory corruption and system freeze during power state transitions in a multi-power domain system may be reduced or eliminated.

In accordance with embodiments of the present disclosure, a system may include a switchable power domain configured to selectively be powered on and powered off during operation of the system and an always-on power domain configured to remain powered on during operation of the system, the always-on power domain including a power management unit. The power management unit may be configured to, in response to a shut down condition for powering down the switchable power domain, determine a state of a bus transaction on a communication bus between the switchable power domain and the always-on power domain and control one or more control signals for controlling the communication bus in order to manipulate completion of the bus transaction to prevent at least one of corruption of data of the bus transaction and a system freeze associated with the bus transaction.

In accordance with these and other embodiments of the present disclosure, a method comprising, in a system comprising a switchable power domain configured to selectively be powered on and powered off during operation of the system and an always-on power domain configured to remain powered on during operation of the system, in response to a shut down condition for powering down the switchable power domain: (i) determining a state of a bus transaction on a communication bus between the switchable power domain and the always-on power domain; and (ii) controlling one or more control signals for controlling the communication bus in order to manipulate completion of the bus transaction to prevent at least one of corruption of data of the bus transaction and a system freeze associated with the bus transaction.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
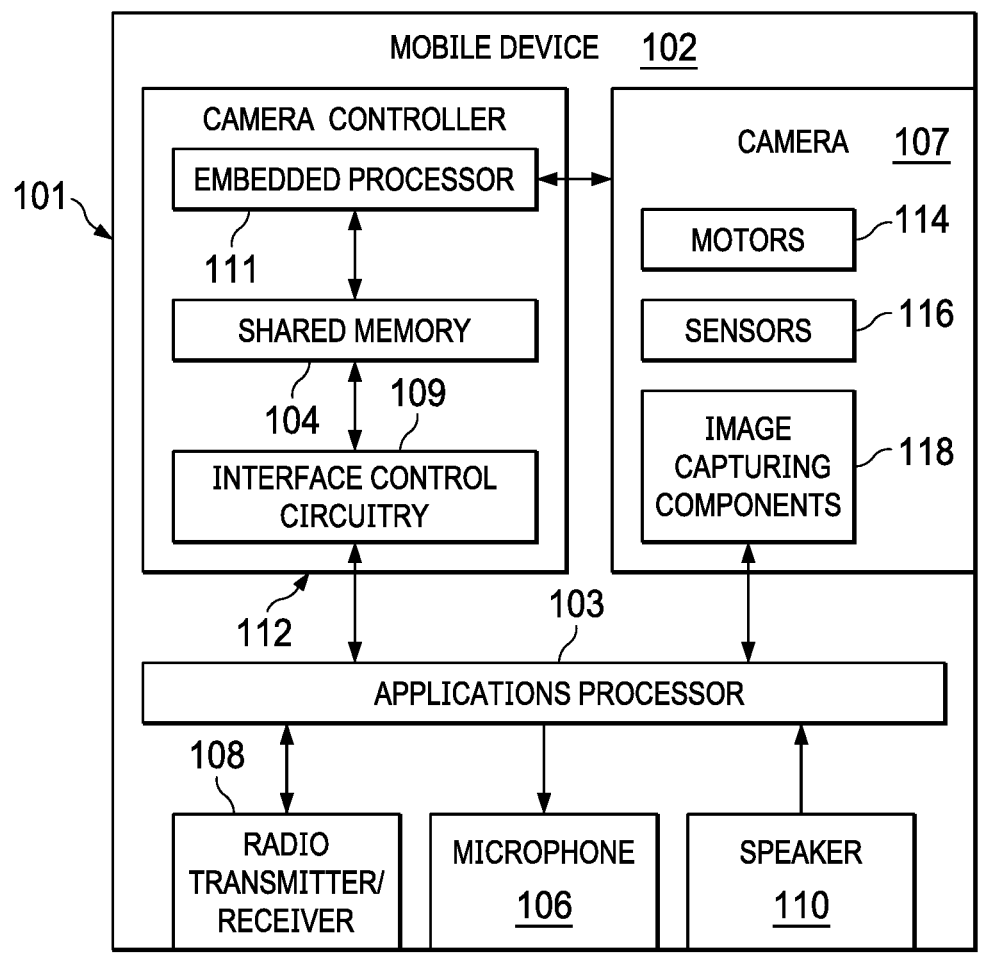
FIG. 1 illustrates a block diagram of selected components of an example mobile device, in accordance with embodiments of the present disclosure.

FIG. 1 illustrates a block diagram of selected components of an example mobile device 102, in accordance with embodiments of the present disclosure. As shown in FIG. 1, mobile device 102 may comprise an enclosure 101, an applications processor 103, a microphone 106, a camera 107, a radio transmitter/receiver 108, a speaker 110, and a camera controller 112.

Enclosure 101 may comprise any suitable housing, casing, or other enclosure for housing the various components of mobile device 102. Enclosure 101 may be constructed from plastic, metal, and/or any other suitable materials. In addition, enclosure 101 may be adapted (e.g., sized and shaped) such that mobile device 102 is readily transported on a person of a user of mobile device 102. Accordingly, mobile device 102 may include but is not limited to a smart phone, a tablet computing device, a handheld computing device, a personal digital assistant, a notebook computer, a video game controller, or any other device that may be readily transported on a person of a user of mobile device 102.

Applications processor 103 may be housed within enclosure 101 and may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, applications processor 103 may interpret and/or execute program instructions and/or process data stored in a memory (not explicitly shown) and/or other computer-readable media accessible to applications processor 103.

Microphone 106 may be housed at least partially within enclosure 101, may be communicatively coupled to applications processor 103, and may comprise any system, device, or apparatus configured to convert sound incident at microphone 106 to an electrical signal that may be processed by applications processor 103, wherein such sound is converted to an electrical signal using a diaphragm or membrane having an electrical capacitance that varies based on sonic vibrations received at the diaphragm or membrane. Microphone 106 may include an electrostatic microphone, a condenser microphone, an electret microphone, a microelectromechanical systems (MEMs) microphone, or any other suitable capacitive microphone.

Radio transmitter/receiver 108 may be housed within enclosure 101, may be communicatively coupled to applications processor 103, and may include any system, device, or apparatus configured to, with the aid of an antenna, generate and transmit radio-frequency signals as well as receive radio-frequency signals and convert the information carried by such received signals into a form usable by applications processor 103. Radio transmitter/receiver 108 may be configured to transmit and/or receive various types of radio-frequency signals, including without limitation, cellular communications (e.g., 2G, 3G, 4G, LTE, etc.), short-range wireless communications (e.g., BLUETOOTH), commercial radio signals, television signals, satellite radio signals (e.g., GPS), Wireless Fidelity, etc.

A speaker 110 may be housed at least partially within enclosure 101 or may be external to enclosure 101, may be communicatively coupled to applications processor 103, and may comprise any system, device, or apparatus configured to produce sound in response to electrical audio signal input. In some embodiments, a speaker may comprise a dynamic loudspeaker, which employs a lightweight diaphragm mechanically coupled to a rigid frame via a flexible suspension that constrains a voice coil to move axially through a magnetic gap. When an electrical signal is applied to the voice coil, a magnetic field is created by the electric current in the voice coil, making it a variable electromagnet. The voice coil and the driver's magnetic system interact, generating a mechanical force that causes the voice coil (and thus, the attached cone) to move back and forth, thereby reproducing sound under the control of the applied electrical signal coming from the amplifier.

Camera 107 may be housed at least partially within enclosure 101 (and partially outside of enclosure 101, to enable light to enter a lens of camera 107), and may include any suitable system, device, or apparatus for recording images (moving or still) into one or more electrical signals that may be processed by applications processor 103. As shown in FIG. 1, camera 107 may include a plurality of motors 114, sensors 116, and image capturing components 118.

Image capturing components 118 may include a collection of components configured to capture an image, including without limitation, one or more lenses and image sensors for sensing intensities and wavelengths of received light. Such image capturing components 118 may be coupled to applications processor 103 such that camera 107 may communicate captured images to applications processor 103.

Motors 114 may be mechanically coupled to one or more of image capturing components 118, and each motor 114 may include any suitable system, device, or apparatus configured to, based on control signals received from camera controller 112 indicative of a desired camera position, drive mechanical motion of such one or more image capturing components 118 to such desired camera position.

Sensors 116 may be mechanically coupled to one or more of image capturing components 118 and/or motors 114 and may be configured to sense a position associated with camera 107. For example, a first sensor 116 may sense a first position (e.g., x-position) of camera 107 with respect to a first linear direction, a second sensor 116 may sense a second position (e.g., y-position) of camera 107 with respect to a second linear direction normal to the first linear direction, and a third sensor 116 may sense a third position (e.g., z-position) of camera 107 (e.g., position of lens) with respect to a third linear direction normal to both the first linear direction and the second linear direction.

Camera controller 112 may be housed within enclosure 101, may be communicatively coupled to camera 107 and applications processor 103 (e.g., via an Inter-Integrated Circuit (I2C) interface), and may include any system, device, or apparatus configured to control motors 114 or other components of camera 107 to place components of camera 107 into a desired position. Camera controller 112 may also be configured to receive signals from sensors 116 regarding an actual position of camera 107 and/or regarding a status of camera 107. As shown in FIG. 1, camera controller 112 may include an embedded processor 111, interface control circuitry 109, and a shared memory 104 communicatively coupled to each of interface control circuitry 109 and embedded processor 111.

Embedded processor 111 may be integral to camera controller 112, and may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, applications processor 103 may interpret and/or execute program instructions and/or process data stored in a memory (e.g., shared memory or other memory) and/or other computer-readable media accessible to embedded processor 111. Specifically, embedded processor 111 may be configured to perform functionality of camera controller 112, including but not limited to control and management of shared memory 104, control of motors 114, and receipt and processing of data from sensors 116.

Shared memory 104 may be integral to camera controller 112, and may be coupled to each of interface control circuitry 109 and embedded processor 111. Shared memory 104 may include any system, device, or apparatus configured to retain program instructions and/or data for a period of time (e.g., computer-readable media). Shared memory 104 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to mobile device 102 is turned off.

Interface control circuitry 109 may comprise any suitable system, device, or apparatus configured to serve as a communication interface between applications processor 103 and shared memory 104.

Figure 2:
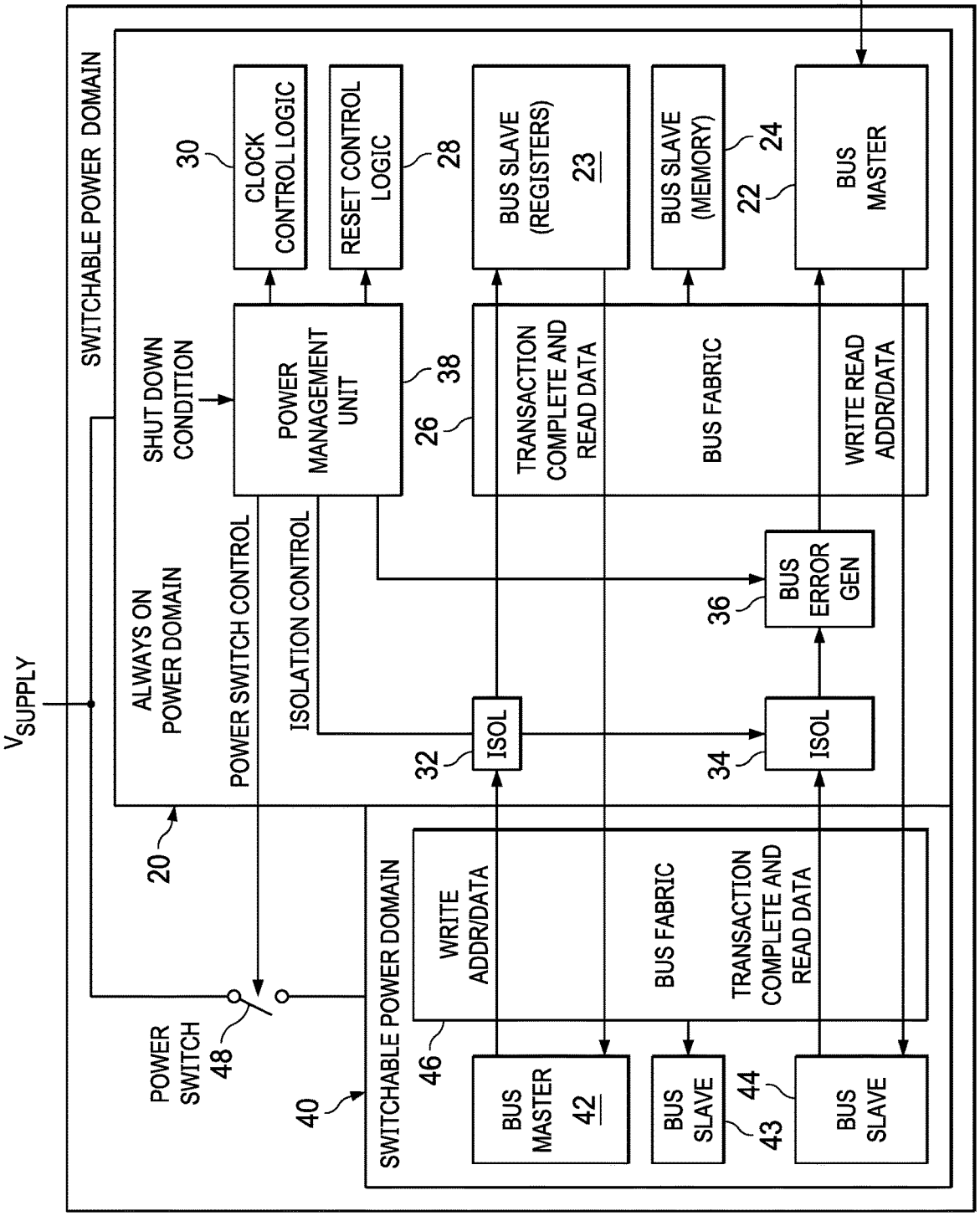
FIG. 2 illustrates a block diagram of selected components of an example camera controller of a mobile device depicting multiple power domains, in accordance with embodiments of the present disclosure.

FIG. 2 illustrates a block diagram of selected components of example camera controller 112 depicting multiple power domains, in accordance with embodiments of the present disclosure. The various components of camera controller 112 depicted in FIG. 1 may be split into multiple power domains, including an always-on power domain 20 and a switchable power domain 40. As shown in FIG. 2, and as described in greater detail below, each of always-on power domain 20 and switchable power domain 40 may comprise components of a pipelined data communication bus.

Although any suitable arrangement of components is contemplated, in the example shown in FIG. 2, always-on power domain 20 may include a bus master 22 in communication with a host 50, bus slaves 23 and 24, a bus fabric 26, reset control logic 28, clock control logic 30, isolation control blocks 32 and 34, a bus error code generator 36, and a power management unit 38 arranged as shown. Switchable power domain 40 may include a bus master 42, bus slaves 43 and 44, and bus fabric 46. A power switch 48 under control of power management unit 38 may selectively enable and disable the provision of electrical energy to switchable power domain 40 from power supply 10.

In operation, each transaction on the data bus between a bus master and a bus slave may include an address phase and a data phase. The data transfer type, an indication of whether a read or write, and a memory/register address may be established in the address phase and the data of the transfer may be established in the data phase.

In traditional approaches (e.g., when power management unit 38 is not present or does not include the functionality described herein), in response to a shut down condition (e.g., a command from host 50 to shut down, an expiration of a timer, an overheating condition, etc.), power switch 48 may be disabled to power down switchable power domain 40 and its components. In addition, in traditional approaches, when a shut down condition occurs, isolation blocks 32, 34 may isolate outputs of switchable power domain 40 from other components of always-on power domain 20. For example, when no shut down condition is present, isolation blocks 32 and 34 may simply pass through data output by switchable power domain 40, while isolation blocks 32 and 34 may drive a constant value (e.g., logic 0) when a shut down condition is present.

Figure 3:
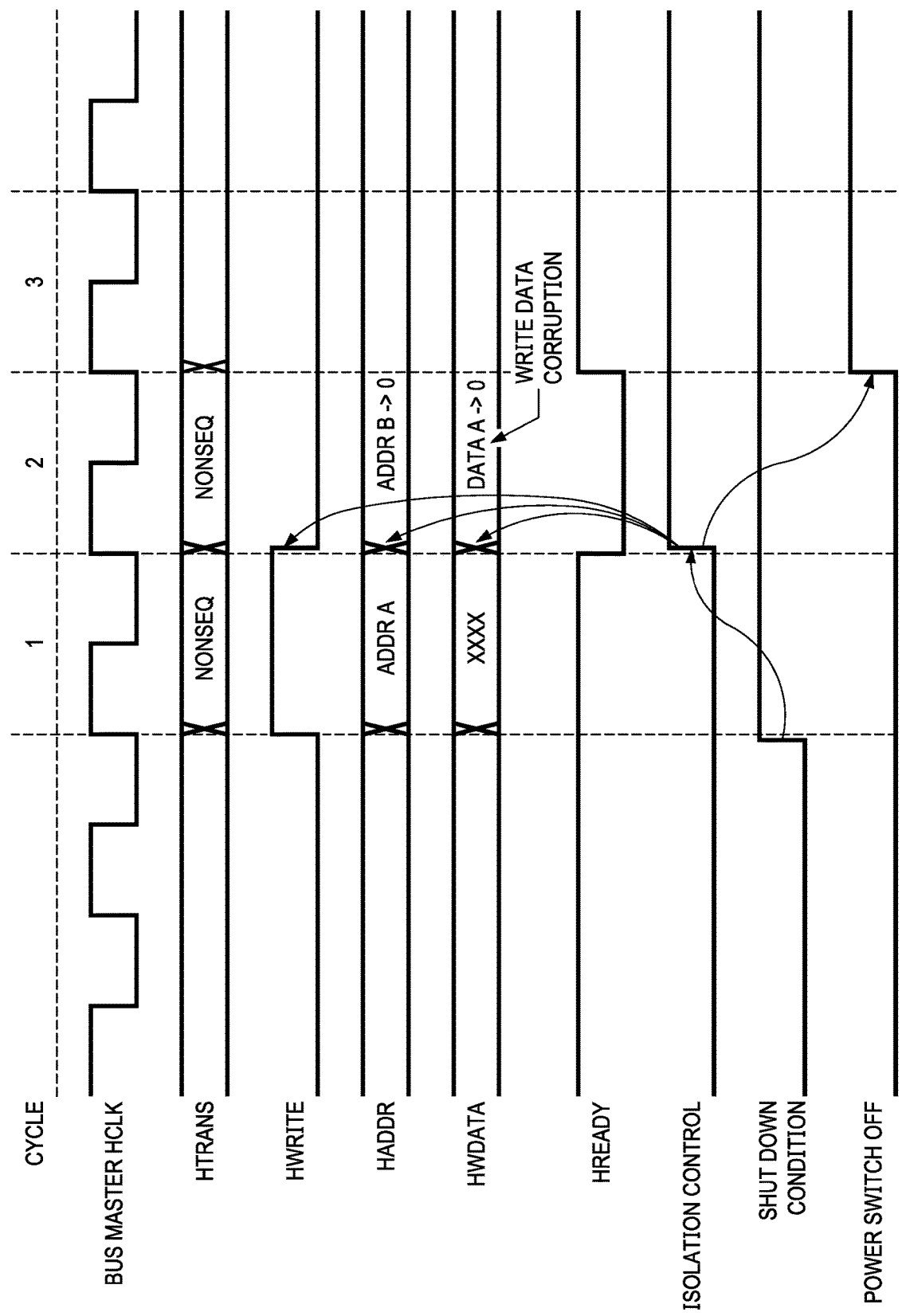
FIG. 3 illustrates a timing diagram depicting the occurrence of data corruption in the absence of data protection logic, in accordance with embodiments of the present disclosure.

FIG. 3 illustrates a timing diagram depicting the occurrence of data corruption as described in the Background section as may occur in the absence of data protection logic implemented by power management unit 38, in accordance with embodiments of the present disclosure. The timing diagram of FIG. 3 (and that of FIGS. 4-6) shows example waveforms for various signals, including the following:

Bus Master HCLK—a synchronization clock for a bus master 22, 42;

HTRANS—variable indicating a data transfer type (e.g., sequential, non-sequential, or "idle" for no transaction);

HWRITE—variable indicating whether the transaction is a write transaction (logic 1) or read transaction (logic 0);

HADDR—variable indicating memory/register address for transaction;

HWDATA—variable indicating write data to be written to address indicated by HADDR in the previous cycle;

HRDATA—variable indicating read data read from address indicated by HADDR in the previous cycle;

HREADY—signal communicated by a bus slave indicating whether the bus slave is ready for a transaction;

Isolation Control—control signal that controls whether isolation blocks 32 and 34 provide isolation (e.g., isolation provided when Isolation Control is logic 1);

Shut Down Condition—indicates with logic 1 the presence of a shut down condition and indicates with logic 0 the absence of a shut down condition; and Power Switch OFF—indicates with logic 1 that power switch 48 is disabled in order to power off switchable power domain 40 and indicates with logic 0 that power switch 48 is enabled in order to power on switchable power domain 40.

As shown in FIG. 3, a shut down condition may occur at the beginning of Cycle 1. However, before switchable power domain 40 can be powered off, during Cycle 1 bus master 42 may begin a write transaction to an address (e.g., Addr A) of bus slave 23, as indicated by HTRANS=NONSEQ, HADDR=Addr A, and HWRITE=1. During Cycle 2, bus master 42 may drive the write data of the transaction HWDATA=Data A corresponding to Addr A. However, due to the shut down condition, isolation block 32 may drive HWDATA to zero and write zeros to Addr A of bus slave 23. Thus, the write transaction may continue as it began during the previous cycle. At Cycle 3, HREADY signal may be driven by bus slave 23 to indicate it is ready for a transaction after the corrupt data is already written to Addr A, and power switch 48 may finally be disabled in response to the shut down condition.

Thus, as shown in FIG. 3, in the event that a domain mastering a write transaction is powered down, its output signals may be forced (isolated) to constants, typically zeros. If the isolation signal is asserted during the data phase of the transaction, the data written to the destination register will be the isolation values instead of the original data, causing data corruption to take place. This situation is especially critical where register addresses are modified through read-modify-write transactions.

Figure 4:
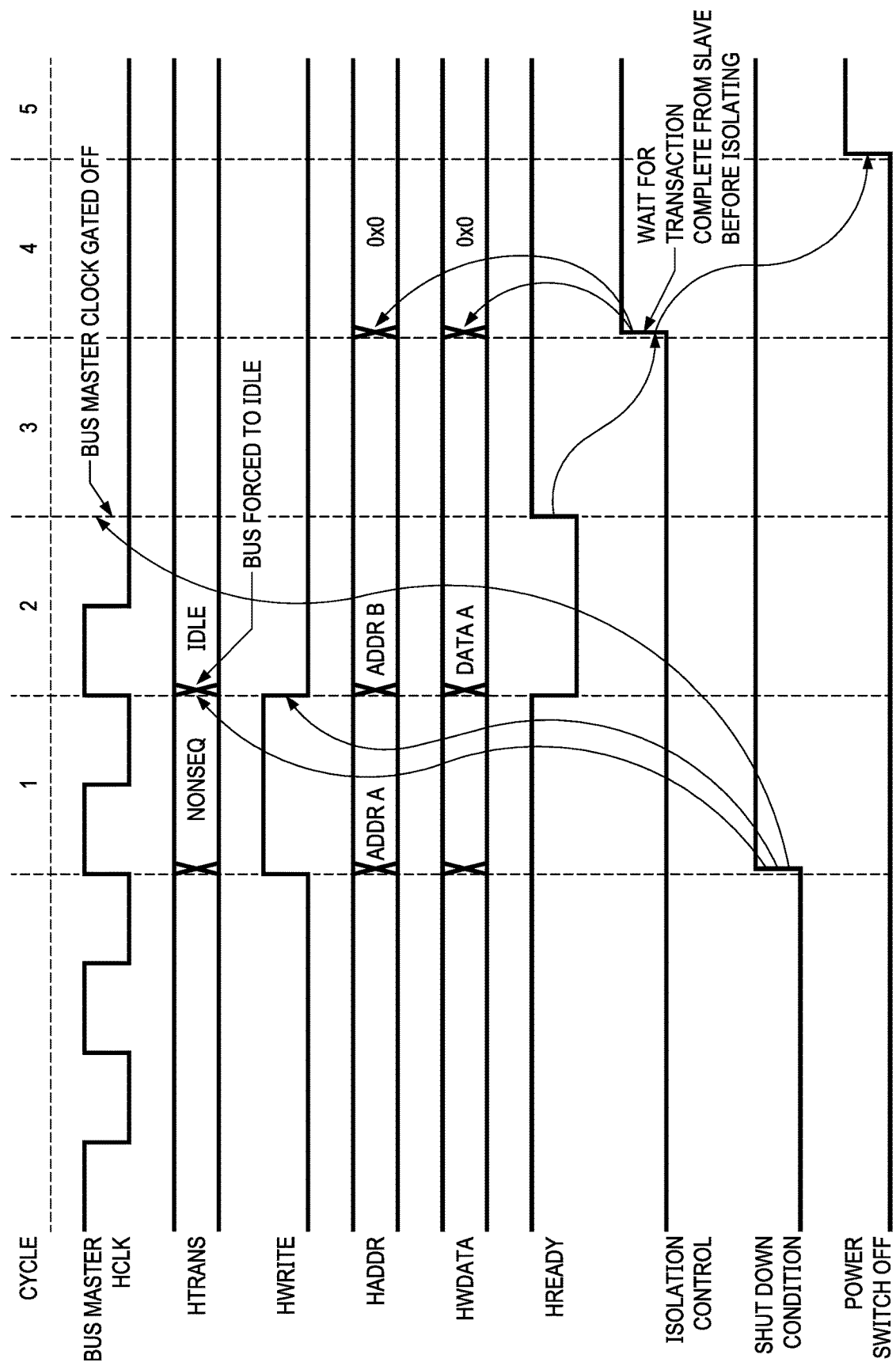
FIG. 4 illustrates a timing diagram depicting functionality of a power management unit implementing data protection logic, in accordance with embodiments of the present disclosure.

FIG. 4 illustrates a timing diagram depicting functionality of power management unit 38 implementing data protection logic to overcome the data corruption problem depicted in FIG. 3, in accordance with embodiments of the present disclosure. As shown in FIG. 4, a shut down condition may occur at the beginning of Cycle 1. However, during Cycle 1 bus master 42 may begin a write transaction to an address (e.g., Addr A) of bus slave 23, as indicated by HTRANS=NONSEQ, HADDR=Addr A, and HWRITE=1. During Cycle 2, bus master 42 may drive the write data of the transaction HWDATA=Data A corresponding to Addr A. To ensure that such data is written and the transaction is completed, power management unit 38 may, during Cycle 2 and thereafter, cause the bus transaction active signal HTRANS to IDLE to prevent further transactions. During Cycle 2, HREADY signal may be driven low by bus slave 23 to indicate it is processing the transaction, and the write transaction may continue. During Cycle 2, power management unit 38 may cause Isolation Control signals to remain deasserted to prevent isolation of the outputs of switchable power domain 40 while the transaction is completed.

During Cycle 3, HREADY signal may be driven high by bus slave 23 to indicate it is ready for a new transaction, thus indicating completion of the transaction initiated during Cycle 1. Also during Cycle 3, power management unit 38 may disable or gate off Bus Master CLK by communicating a suitable signal to clock control logic 30 in order to prevent further transactions from being communicated from bus master 42. At Cycle 4 (or subsequent cycles), in response to the completion of the transaction as indicated by HREADY signal, power management unit 38 may assert Isolation Control signals to cause isolation of the outputs of switchable power domain 40 by isolation blocks 32 and 34. At Cycle 5, also in response to the completion of the transaction as indicated by HREADY signal, power management unit 38 may disable power switch 48, in order to power off switchable power domain 40.

Thus, power management unit 38 may be configured to detect the shut down condition, and may in response thereto, in order to prevent data corruption:
  disable bus master HLCK to freeze the current state of the data bus signals HWDATA from switched power domain 40;
  mask the bus transaction active signal (e.g., set HTRANS=IDLE) to block further write transactions from switchable power domain 40;
  wait for assertion of the HREADY signal from bus slave 23 that indicates completion of the write transaction, and in response to completion of the write transaction:
    assert Isolation Control signals to cause isolation blocks 32, 34 to isolate the outputs of switchable power domain 40 from components of always-on power domain 20; and
  power down switchable power domain 40 by disabling power switch 48.

A timeout signal may be asserted if the HREADY signal is not set within a pre-determined time, and an error signal may be asserted in response to expiration of the pre-determined time.

Figure 5:
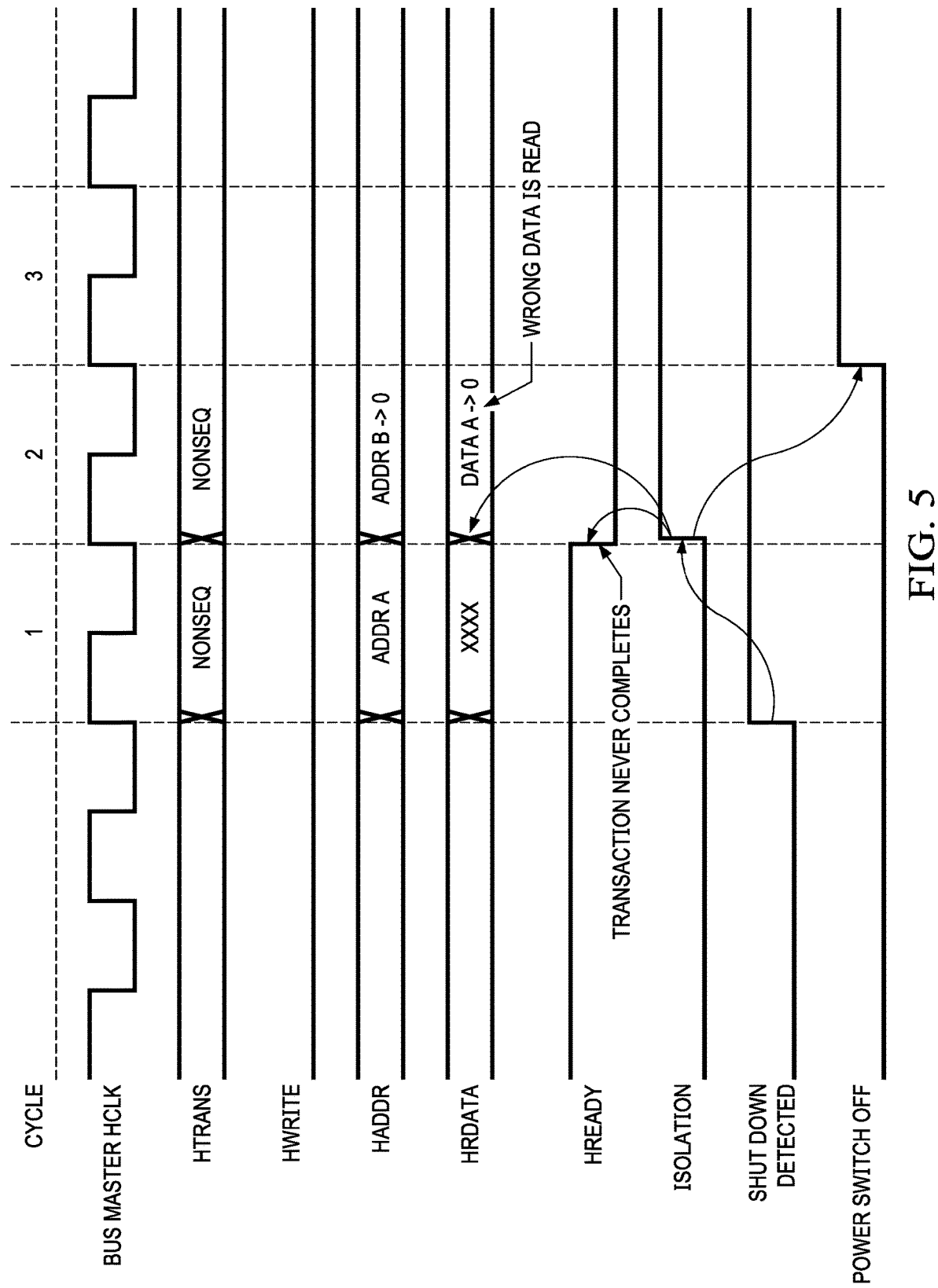
FIG. 5 illustrates a timing diagram depicting the occurrence of a system freeze in the absence of power management logic, in accordance with embodiments of the present disclosure.

FIG. 5 illustrates a timing diagram depicting the occurrence of a system freeze of camera controller 112 in the absence of power management logic implemented by power management unit 38, in accordance with embodiments of the present disclosure. As shown in FIG. 5, a shut down condition may occur at the beginning of Cycle 1. However, before switchable power domain 40 can be powered off, during Cycle 1 bus master 22 may begin a read transaction to an address (e.g., Addr A) of bus slave 44, as indicated by HTRANS=NONSEQ, HADDR=Addr A, and HWRITE=0. It is noted that the system freeze problem may occur for read or write transactions, but the problem is discussed herein with respect only to a read transaction. During Cycle 2, bus slave 44 may drive the read data of the transaction HRDATA=Data A corresponding to Addr A. However, due to the shut down condition, isolation block 34 may drive HRDATA to zero and return zeros to bus master 22 in response to the read transaction. In addition, at Cycle 2, HREADY signal may be driven by bus slave 44 to indicate it is processing a transaction, but isolation block 34 may cause HREADY signal to remain at a value (e.g., zeroes) indicating it is processing a transaction, and the transaction may never complete from the viewpoint of bus master 22, causing bus master 22 to freeze. During Cycle 3, power switch 48 may be disabled in response to the shut down condition.

Thus, as shown in FIG. 5, it is possible that a bus slave in switchable power domain 40 accessed by a bus master is powered down before a signal indicating completion of the transaction is communicated to the bus master, which may lead to one or more of the following problems: (a) for a read transaction, the bus master reading isolation values (e.g., 0) without bus master knowledge that invalid data has been read; (b) for a write transaction, write data being lost without bus master knowledge that invalid data has been read; and (c) the bus master waiting indefinitely for the transaction complete signal, therefor freezing camera controller 112 which may require power cycling camera controller 112 to place it back into normal operation conditions.

Figure 6:
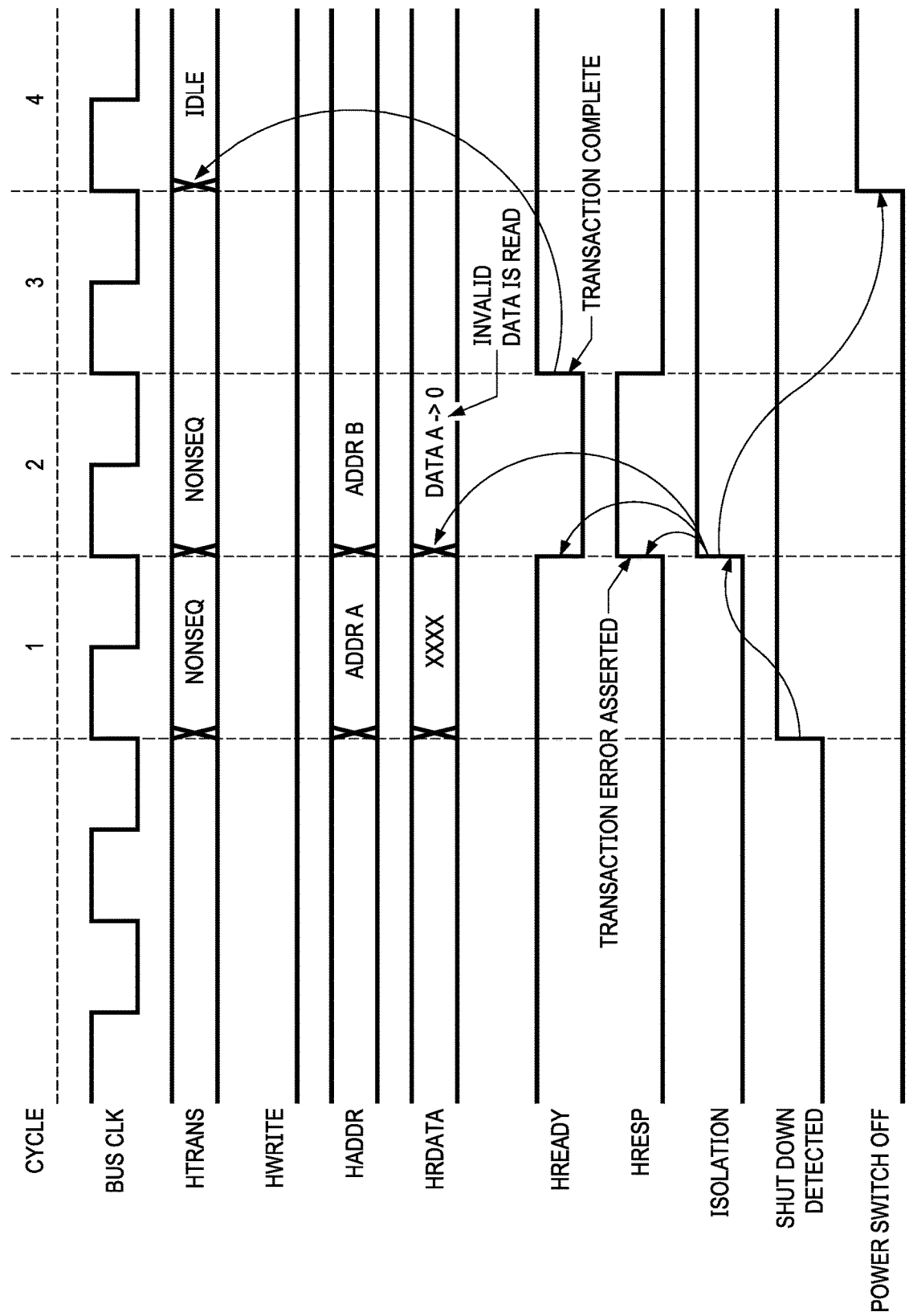
FIG. 6 illustrates a timing diagram depicting functionality of a power management unit implementing power management logic, in accordance with embodiments of the present disclosure.

FIG. 6 illustrates a timing diagram depicting functionality of a power management unit 38 implementing power management logic to overcome the system freeze problem depicted in FIG. 5, in accordance with embodiments of the present disclosure. As shown in FIG. 6, a shut down condition may occur at the beginning of Cycle 1. However, during Cycle 1 bus master 22 may begin a read transaction to an address (e.g., Addr A) of bus slave 44, as indicated by HTRANS=NONSEQ, HADDR=Addr A, and HWRITE=0. During Cycle 2, bus slave 44 may drive the read data of the transaction HRDATA=Data A corresponding to Addr A. Due to the shut down condition, isolation block 34 may drive HRDATA to zero and return zeros in response to the read transaction. However, to ensure transaction completion from the standpoint of bus master 22, power management unit 38 may cause bus error generator 36 to assert a bus error signal HRESP which may in turn cause transaction completion signal HREADY, as seen by bus master 22, at Cycle 3 to indicate completion of the previous transaction. At Cycle 4, also in response to the completion of the transaction as indicated by HREADY signal, power management unit 38 may disable power switch 48, in order to power off switchable power domain 40.

Thus, power management unit 38 may be configured to detect the shut down condition, and may in response thereto, in order to prevent system freeze:

cause bus error generator 36 to generate a bus error generation signal (e.g., HRESP=1) to indicate to bus master 22 that data being read from bus slave 44 is invalid and also to cause the transaction completion signal (e.g., HREAD) as seen by bus master 22 to indicate completion of the transaction; and in response to completion of the write transaction:

assert Isolation Control signals to cause isolation blocks 32, 34 to isolate the outputs of switchable power domain 40 from components of always-on power domain 20; and power down switchable power domain 40 by disabling power switch 48.

In lieu of causing bus error generator 36 to generate a bus error generation signal (e.g., HRESP=1) to indicate to bus master 22 that data being read from bus slave 44 is invalid and also to cause the transaction completion signal (e.g., HREAD) as seen by bus master 22 to indicate completion of the transaction, power management unit 38 may wait until the HREADY signal is asserted by bus slave 44 before asserting the isolation signal. The HRESP error signal may not be set in this case, because the read operation completed successfully. A timeout signal may be asserted if bus slave 44 does not assert the ready signal within a predetermined number of clock cycles, and the HRESP=1 signal may be set.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system comprising:

a switchable power domain configured to selectively be powered on and powered off during operation of the system; and an always-on power domain configured to remain powered on during operation of the system, the always-on power domain including a power management unit configured to, in response to a shut down condition for powering down the switchable power domain:

determine a state of a bus transaction on a communication bus between the switchable power domain and the always-on power domain, wherein the bus transaction is a transaction from a bus master to a bus slave;

control one or more control signals for controlling the communication bus in order to manipulate completion of the bus transaction to prevent at least one of corruption of data of the bus transaction and a system freeze associated with the bus transaction;

monitor for completion of the bus transaction;

in response to an indication of completion of the bus transaction, power down the switchable power domain;

in response to an absence of the indication of completion within a predetermined time, assert an error signal in response to expiration of the pre-determined time; and communicate an indication to the bus master that data read from the bus slave is invalid.

2. The system of claim 1, wherein:

the bus master is integral to the switchable power domain and the bus slave is integral to the always-on power domain; and the power management unit is further configured to, in response to the shut down condition:

freeze a current state of bus signals from the switchable power domain; and block further write transactions from the switchable power domain.

3. The system of claim 2, wherein the power management unit is further configured to, in response to completion of the bus transaction, electrically isolate outputs of the switchable power domain from the always-on power domain.

4. The system of claim 2, wherein the power management unit is configured to freeze the current state of bus signals from the switchable power domain by disabling a synchronization clock of the bus master.

5. The system of claim 2, wherein the power management unit is configured to block further write transactions from the switchable power domain by masking a bus transaction active signal associated with the communication bus.

6. The system of claim 1, wherein:
the bus master is integral to the always-on power domain and the bus slave is integral to the switchable power domain; and
the power management unit is configured to, in response to the shut down condition:
cause a transaction completion signal as seen by the bus master to indicate completion of the transaction.

7. The system of claim 6, wherein the power management unit is further configured to, in response to the transaction completion signal as seen by the bus master indicating completion of the transaction, power down the switchable power domain.

8. The system of claim 6, wherein the power management unit is further configured to, in response to completion of the bus transaction, in response to the transaction completion signal as seen by the bus master indicating completion of the transaction, electrically isolate outputs of the switchable power domain from the always-on power domain.

9. A method comprising, in a system comprising a switchable power domain configured to selectively be powered on and powered off during operation of the system and an always-on power domain configured to remain powered on during operation of the system, in response to a shut down condition for powering down the switchable power domain:
determining a state of a bus transaction on a communication bus between the switchable power domain and the always-on power domain, wherein the bus transaction is a transaction from a bus master to a bus slave;
controlling one or more control signals for controlling the communication bus in order to manipulate completion of the bus transaction to prevent at least one of corruption of data of the bus transaction and a system freeze associated with the bus transaction;
monitoring for completion of the bus transaction;
in response to an indication of completion of the bus transaction, powering down the switchable power domain;
in response to an absence of the indication of completion within a predetermined time, asserting an error signal in response to expiration of the pre-determined time; and
communicate an indication to the bus master that data read from the bus slave is invalid.

10. The method of claim 9, wherein:
the bus master is integral to the switchable power domain and the bus slave is integral to the always-on power domain; and
the method further comprises, in response to the shut down condition:
freezing a current state of bus signals from the switchable power domain; and
blocking further write transactions from the switchable power domain.

11. The method of claim 10, further comprising, in response to completion of the bus transaction, electrically isolating outputs of the switchable power domain from the always-on power domain.

12. The method of claim 10, further comprising freezing the current state of bus signals from the switchable power domain by disabling a synchronization clock of the bus master.

13. The method of claim 10, further comprising blocking further write transactions from the switchable power domain by masking a bus transaction active signal associated with the communication bus.

14. The method of claim 9, wherein:
the bus master is integral to the always-on power domain and the bus slave is integral to the switchable power domain; and
the method further comprises, in response to the shut down condition:
causing a transaction completion signal as seen by the bus master to indicate completion of the transaction.

15. The method of claim 14, further comprising, in response to the transaction completion signal as seen by the bus master indicating completion of the transaction, powering down the switchable power domain.

16. The method of claim 14, further comprising, in response to completion of the bus transaction, in response to the transaction completion signal as seen by the bus master indicating completion of the transaction, electrically isolating outputs of the switchable power domain from the always-on power domain.

* * * * *